United States Patent
Hall, Jr.

(10) Patent No.: US 6,934,701 B1
(45) Date of Patent: Aug. 23, 2005

(54) USING A STORED PROCEDURE TO ACCESS INDEX CONFIGURATION DATA IN A REMOTE DATABASE MANAGEMENT SYSTEM

(75) Inventor: Harold Hershey Hall, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,463

(22) Filed: Jan. 4, 2000

(51) Int. Cl.⁷ .............................................. G06F 17/30
(52) U.S. Cl. ............................ 707/2; 707/101; 704/10; 711/118; 711/216; 714/11; 345/622; 715/513; 715/532
(58) Field of Search ................................ 707/1–4, 101, 707/203, 500, 507, 529, 532, 10, 100, 102, 200, 513; 704/9, 10; 345/622, 641, 670; 711/118, 129, 150, 216; 714/11

(56) References Cited

U.S. PATENT DOCUMENTS

| | | |
|---|---|---|
| 5,483,651 A | 1/1996 | Adams et al. ................. 707/1 |
| 5,539,427 A | 7/1996 | Bricklin et al. ............. 345/622 |
| 5,583,763 A | 12/1996 | Atcheson et al. ............... 707/3 |
| 5,845,305 A | 12/1998 | Kujiraoka ................... 707/532 |
| 5,913,206 A * | 6/1999 | Chaudhuri et al. ............ 707/1 |
| 6,321,218 B1 * | 11/2001 | Guay et al. .................... 707/2 |
| 6,321,235 B1 * | 11/2001 | Bird .............................. 707/2 |

FOREIGN PATENT DOCUMENTS

EP    0 743 609 A2    11/1996

OTHER PUBLICATIONS

S. Chaudhuri, (1998) Microsoft Index Tuning Wizard for SQL Server 7.0, Sigmod Record 27(2):553–554.

* cited by examiner

*Primary Examiner*—Shahid Alam
(74) *Attorney, Agent, or Firm*—Gates & Cooper LLP

(57) ABSTRACT

An index advisor specifies an optimal index configuration for use in performing workloads against a database managed by a database management system. If the database and database management system are remotely located from the index advisor, then the index advisor invokes a stored procedure in the database management system in order to obtain information for the optimal index configuration.

18 Claims, 3 Drawing Sheets

| WORKLOAD NAME 200 | STATEMENT TEXT 202 | STATEMENT TAG 204 | FREQUENCY 206 | IMPORTANCE 208 | WEIGHT 210 |
|---|---|---|---|---|---|
| | | | | | |
| | | | | | |
| | | | | | |
| | | | | | |
| | | | | | |

WORKLOAD TABLE 116, 122

*FIG. 2*

USING A STORED PROCEDURE TO ACCESS INDEX CONFIGURATION DATA IN A REMOTE DATABASE MANAGEMENT SYSTEM

BACKGROUND OF THE INVENTION

1. Field of the Invention.

This invention relates in general to programming development environments, and in particular, to the use of a stored procedure to access index configuration data in a remote relational database management system.

2. Description of Related Art

Computer systems incorporating Relational DataBase Management Systems (RDBMS) using a Structured Query Language (SQL) interface are well known in the art. The SQL interface has evolved into a standard language for an RDBMS and has been adopted as such by both the American National Standards Institute (ANSI) and the International Standards Organization (ISO).

Indexes are often used to enhance the performance of an RDBMS in the execution of SQL statements. For each table referenced in an SQL statement, if no index exists on the table, then a table scan must be performed on that table. On the other hand, if an index is available, it will be selected for use if the RDBMS optimizer function estimates that an index scan will be faster than a table scan.

Index files generally are smaller and require less time to scan than an entire table. In addition, the entire index may not need to be scanned. The predicates applied to the index reduce the number of rows to be read from the table.

Generally, a user cannot control whether an index is used by the RDBMS in the execution of SQL statements. The RDBMS optimizer makes these decision based on available table and index information.

However, the user can play an important role in the process by creating, modifying, or deleting a configuration of indexes associated with the target tables of a query, which will affect the actions taken by the RDBMS optimizer. Thus, the configuration of indexes should be carefully chosen to address the needs of an application.

To determine whether an index should be used in a specific set of SQL statements, RDBMS vendors provide a number of different utilities. Utilities are known to exist that will recommend to users what indexes they should create for optimal performance in the RDBMS. Generally, such utilities will even create the indexes, if so instructed by the user.

A problem arises, however, when the utilities are executed by an RDBMS that is not the RDBMS for which recommendations are desired. Generally, the utilities cannot make recommendations for remote databases, because the utilities do not have access to the information necessary for making such recommendations. Thus, there is a need in the art for a mechanism that can supply the necessary information concerning remote databases to a utility that advises users concerning the optimal configuration of indexes.

SUMMARY OF THE INVENTION

To overcome the limitations in the prior art described above, and to overcome other limitations that will become apparent upon reading and understanding the present specification, the present invention discloses a method, apparatus, and article of manufacture for executing an index advisor that specifies an optimal index configuration for use in performing workloads against a database managed by a database management system. If the database and database management system are remotely located from the index advisor, then the index advisor invokes a stored procedure in the database management system in order to obtain information for the optimal index configuration.

BRIEF DESCRIPTION OF THE DRAWINGS

Referring now to the drawings in which like reference numbers represent corresponding parts throughout:

FIG. 2 is a block diagram illustrating the structure of a workload table according to the preferred embodiment of the present invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

A relational database management system (RDBMS) includes an "index advisor" that specifies an optimal index configuration for use in performing operations against a relational database managed by the RDBMS. However, if a local RDBMS wants to perform operations against a remote relational database managed by a remote RDBMS, the index advisor requires information from the remote RDBMS. The present invention provides a mechanism for the local RDBMS to obtain such information from the remote RDBMS using a stored procedure executed by the remote RDBMS.

Hardware and Software Environment

Figure 1:
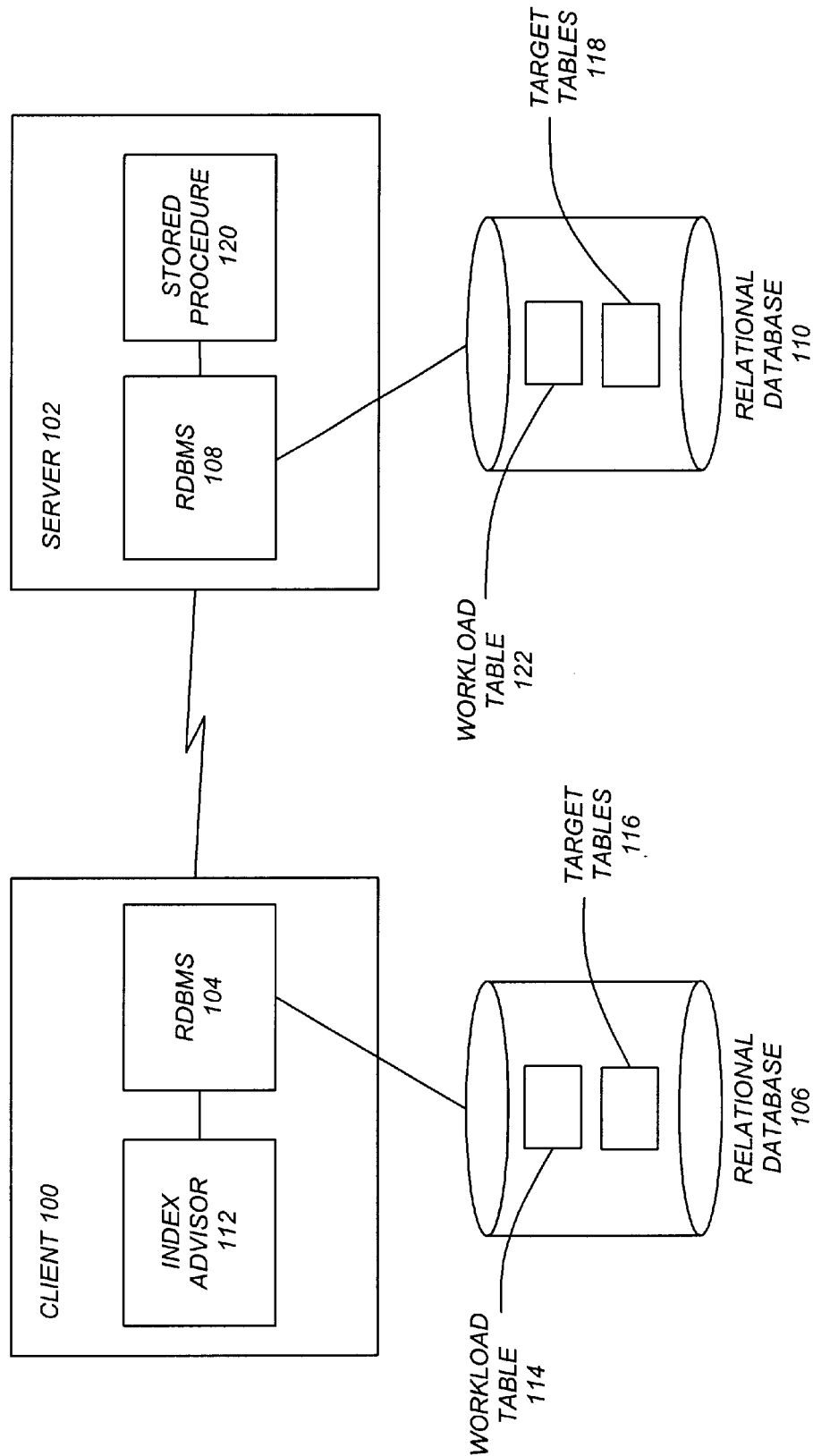
FIG. 1 illustrates an exemplary computer hardware environment that could be used with the preferred embodiment of the present invention.

FIG. 1 is a block diagram illustrating an exemplary hardware environment used to implement the preferred embodiment of the invention. In the exemplary hardware environment, a client/server architecture is illustrated comprising a client (i.e., local) computer 100 coupled to a server (i.e., remote) computer 102. Both the client computer 100 and server computer 102 may include, inter alia, processors, random access memory (RAM), read-only memory (ROM), keyboard, display, fixed and/or removable data storage devices, and data communications devices. Those skilled in the art will recognize that any combination of the above components, or any number of different components, peripherals, and other devices, may be used with the client computer 100 and server computer 102. Those skilled in the art will also recognize that the present invention may be implemented on a single computer, rather than multiple computers networked together.

In the example illustrated in FIG. 1, a client (i.e., local) RDBMS 104 executed by the client computer 100 manages a (local) relational database 106 stored on the client computer 100. Similarly, a server (i.e., remote) RDBMS 108 executed by the server computer 102 manages a (remote) relational database 110 stored on the server computer 102. Moreover, the client RDBMS 104 and the server RDBMS 108 interact in such a manner that data and/or queries may be shared between the two systems. In the preferred embodiment of the present invention, the RDBMS 104, 108 comprises the DataBase 2 (DB2™) product offered by IBM Corporation, although those skilled in the art will recognize that the present invention has application to any RDBMS, and to many other types of database management systems as well.

Generally, the RDBMS 104, 108 comprises logic and/or data that is embodied in or accessible from a device, medium, or carrier, e.g., a fixed or removable data storage device, a remote device coupled to a computer by a data communications device, etc. Moreover, this logic and/or data, when read, executed, and/or interpreted by the computer, cause the computer to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass logic or instructions accessible from any computer-readable device, carrier, or media.

Of course, those skilled in the art will recognize many modifications may be made to this configuration without departing from the scope of the present invention. For example, those skilled in the art will recognize that any combination of the above components, or any number of different components, including different computer programs, peripherals, and other devices, may be used to implement the present invention, so long as similar functions are performed thereby.

Index Advisor

In the present invention, the client RDBMS 104 includes an index advisor 112 that provides advice to a user concerning an optimal configuration of indexes for a designated set of SQL statements. The index advisor 112 provides a graphical user interface (GUI) and operates in the manner of a "wizard", as that term is understood in the computer industry. In using the index advisor 112, the designated set of SQL statements are known as a "workload" and are stored in a workload table 114. The index advisor 112 analyzes the workload in conjunction with a designated set of target tables 116, in order to determine an optimal configuration of indexes.

A problem arises, however, if the index advisor 112 of the client RDBMS 104 is used with target tables 118 that reside in the remote relational database 110 managed by the server RDBMS 108, rather than the local relational database 106 managed by the client RDBMS 104. In the prior art, an index advisor 112 performed by the client RDBMS 104 could not function for target tables 118 in the remote relational database 110 of the server RDBMS 108. The present invention, on the other hand, provides a solution to this problem, by supplying the necessary information from the server RDBMS 108 to the client RDBMS 104, so that the index advisor 112 of the client RDBMS 104 can provide a list of recommendations for index configurations on the server RDBMS 108.

According to the preferred embodiment, the index advisor 112 of the client RDBMS 104 leads a user through the following steps.

1. Introduction—This step introduces the user to the index advisor 112 by displaying text and listing the names of the relational databases 106, 110.

2. Workload—This step allows the user to specify information concerning a "workload." A workload generally comprises at least one SQL statement, and often comprises a set of related SQL statements. The user can select an existing workload, create a new workload, modify the contents of a workload, capture a workload, etc., as subfunctions of this step.

3. Limits—This step allows the user to specify information concerning limits or boundaries for the selected workload. Generally, there are limits as to how much storage to make available for indexing, how long the calculations can execute, etc. Those skilled in the art will recognize that any number of different limits may be specified at this step.

4. Define Targets—This step allows the user to identify the target RDBMS 104, 108 where the index advisor 112 will perform its functions using tables 116, 118. Users have the ability to create the target tables 116, 118 by extracting information from the RDBMS 104, 108 for which index recommendations are desired, or use the existing target tables 116, 118 if they already have been created. If the index advisor 112 of the client RDBMS 104 identifies target tables 118 in the remote relational database 110 of the server RDBMS 108, it is necessary to obtain a workload from the server RDBMS 108, and as a result, a stored procedure 120 is triggered in the server RDBMS 108 to obtain the necessary information for the index advisor 112. Usually, this stored procedure 120 creates a workload table 122 on the server RDBMS 108 and then stores the SQL statements comprising the workload into the workload table 122. Often, these SQL statements are obtained from a cache maintained by the server RDBMS 108.

Thereafter, the index advisor 112 can perform SELECT statements against the workload table 122 on the server RDBMS 108 and performs INSERT statements to copy data into the workload table 114 on the client RDBMS 106, where it can be used by the index advisor 112.

Additionally, the index advisor 112 can thereafter perform SELECT statements against a catalog in the remote relational database 110 of the server RDBMS 108 in order to create SQL statements that will recreate the necessary environment for the index advisor 112 to perform its functions on the client RDBMS 104. A number of different types of SQL statements are generated, as described below.

First, the stored procedure 120 examines the remote relational database 110 managed by the server RDBMS 108 in order to generate CREATE TABLE, CREATE INDEX and CREATE VIEW statements that are then executed on the client RDBMS 104. These statements create target tables 116 in the local relational database 106 managed by the client RDBMS 104 that are similar to the target tables 118 in the remote relational database 110 managed by the server RDBMS 108. Note that the CREATE statements copy the structure of the target tables 118 from the remote relational database 110 managed by the server RDBMS 108 to the target tables 116 in the local relational database 106 managed by the client RDBMS 104, without copying the actual data of the target tables 118.

Second, the index advisor 112 can issue SELECT statements to the server RDBMS 110 that examine statistics in the catalog of the server RDBMS 108 and generate UPDATE statements that are then executed in the client RDBMS 104. The UPDATE statements copy statistics in the catalog of the server RDBMS 108 to update statistics in the catalog of the client RDBMS 104.

Note that the stored procedure 120 copies both the structure as well as the data of the selected workload table 122 from the remote relational database 110 managed by the server RDBMS 108 to the workload table 114 in the local relational database 106 managed by the client RDBMS 104.

Finally, the index advisor 112 may also modify some of the operating or environmental parameters of the local relational database 106 and/or the client RDBMS 104 to better match to the remote relational database 110 and the server RDBMS 108.

5. Calculate—This step performs the actual index advisor 112 function. Using the information specified above by the user and provided by the target tables 116, 118, the index advisor 112 performs multi-pass calculations using the workload tables 114, 122, in order to provide at least one recommendation concerning the configuration of indexes for the target tables 116, 118. These multi-pass calculations are described in more detail below.

In Pass 1, all indexes are generated. For each SQL statement specified in the workload, a special EXPLAIN operation is performed, which requests that an optimizer of the RDBMS 104, 108 generate any interesting configuration of indexes it might want for the workload. After the EXPLAIN, the results are a list of the indexes that this statement could use, as well as an estimated cost for this statement. After processing all the indexes, the Calculate function has a list of all the indexes that would be desired. It also multiplies the estimated cost of each SQL statement by the WEIGHT of that SQL statement to provide a total workload cost for this Pass.

Between passes, the Calculate step examines the set of available indexes, the limits that the user has imposed, and the workload cost estimate. It then determines if another pass should be performed, or if it is finished. If another pass is required, the Calculate step examines each of the complete set of actual and desired indexes, and marks them as to whether or not they should be considered for the next pass.

In any other Pass N, the Calculate step considers the particular subset of indexes. For each SQL statement, a special EXPLAIN operation is performed, requesting the optimizer of the RDBMS 104, 106 to consider the "marked" indexes during access path selection. After the EXPLAIN, the results are a list of the indexes that were actually used, as well as an estimated cost for this SQL statement. The Calculate step multiplies the estimated cost for each SQL statement by the weighting for that SQL statement to arrive at a total workload cost if the marked indexes were used. At this point, the Calculate step loops back to the "between passes" logic described above, and determines whether the step is completed, or whether another Pass N will be performed.

The Calculate step can include an option to perform the calculations immediately, or to schedule the calculations for later execution. There may also be an option to limit how long the Calculate step can execute in an attempt to determine the optimal configuration of indexes.

6. Recommendations—This step displays the output results from the calculations. In the preferred embodiment, the index advisor 112 displays a list having one or more recommendations concerning the configuration of indexes for the target tables 116, 118. Optionally, the index advisor 112 allows the user to select one or more of the recommendations from the displayed list and create the selected indexes.

7. Drop—This step also displays the output results from the calculations. However, rather than displaying a list of recommendations concerning the creation of indexes for the target tables 116, 118, the index advisor 112 displays a list having one or more recommendations for the deletion of indexes. Thereafter, the index advisor 112 allows the user to select one or more of the configurations from the displayed list and then drops the selected indexes.

8. Summary—This step also displays a script that was generated from the previous steps. The script is comprised of the SQL statements that were recommended and that were selected by the user from the previous steps. The user may run this script or save it.

Workload Table

FIG. 2 illustrates the structure of the workload tables 114, 122 according to the preferred embodiment of the present invention. As mentioned above, the Workload function of Step 2 models at least one SQL statement. In the preferred embodiment, this model is stored in a workload tables 114, 122 in the relational databases 106, 110, wherein the workload tables 114, 122 comprises the following columns:

WORKLOADNAME CHAR(128) NOT NULL (200)—The name of the workload.

STATEMENTTEXT CLOB 64K NOT NULL NOT LOGGED (202)—An SQL statement(s) for this workload.

STATEMENTTAG CHAR(256) (204)—An arbitrary name for this SQL statement.

FREQUENCY INTEGER NOT NULL (206)—A frequency for the SQL statement, which provides part of the weighting for this SQL statement.

IMPORTANCE REAL NOT NULL (208)—An importance for the SQL statement, which provides another part of the weighting for this SQL statement.

WEIGHT REAL NOT NULL (210)—A weight for the SQL statement, is a product of the frequency and importance (i.e., FREQUENCY * IMPORTANCE).

Logic of the Preferred Embodiment

Figure 3:
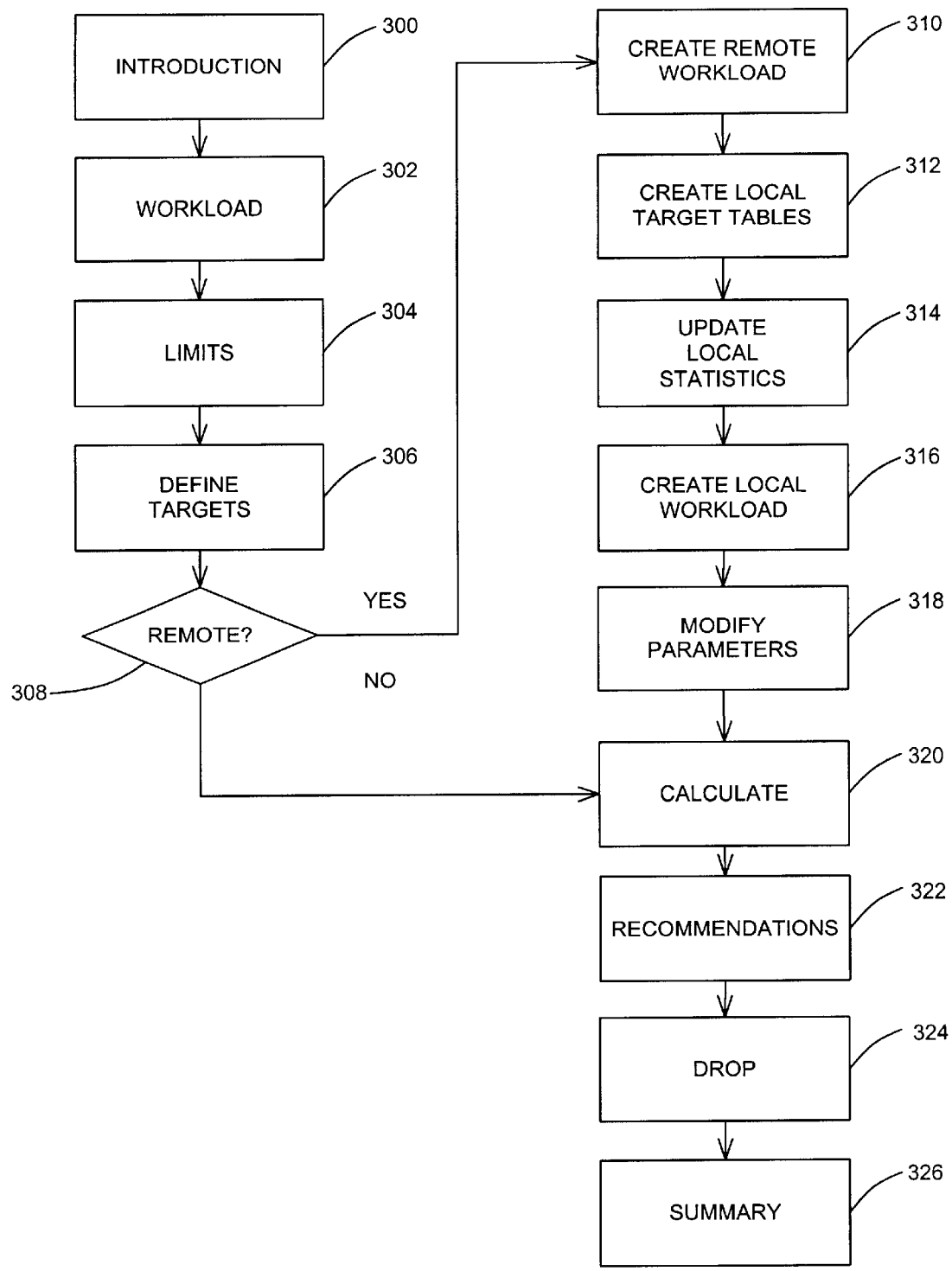
FIG. 3 is a flowchart illustrating the steps performed by the index advisor and stored procedure according to the preferred embodiment of the present invention.

FIG. 3 is a flowchart illustrating the logic performed according to the preferred embodiment of the present invention.

Block 300 represents the index advisor 112 performing the Introduction step by displaying text and listing the name of the relational databases 106, 110.

Block 302 represents the index advisor 112 performing the Workload step by allowing the user to specify information concerning a workload.

Block 304 represents the index advisor 112 performing the Limits step by allowing the user to specify information concerning limits or boundaries of the selected workload.

Block 306 represents the index advisor 112 performing the Define Targets step by allowing the user to identify the target tables 116, 118 where the actual query will be performed.

Block 308 is a decision block that represents the index advisor 112 determining whether the workload is remote, i.e., it resides on the server RDBMS 108. If so, control transfers to Block 310; otherwise, control transfers to Block 320.

Block 310 represents the index advisor 112 invoking the stored procedure 120 on the server RDBMS 108 to create a workload table 122 on the server computer 102 by storing dynamic SQL statements from a cache in the server RDBMS 108.

Block 312 represents the stored procedure 120 generating CREATE TABLE, CREATE INDEX and CREATE VIEW statements to create the local target tables 116 by examining the remote relational database 110 managed by the server RDBMS 108.

Block 314 represents the stored procedure 120 generating UPDATE statements to update the statistics in the client RDBMS 104 by examining the statistics in the catalog of the relational database 110 managed by the server RDBMS 108.

Block 316 represents the stored procedure 120 on the server RDBMS 108 copying the workload table 122 from the remote relational database 110 managed by the server RDBMS 108 to the workload table 114 in the local relational database 106 managed by the client RDBMS 104.

Block 318 represents the stored procedure 120 on the server RDBMS 108 modifying some of the operating or environmental parameters of the local relational database 106 and/or the client RDBMS 104 to better match to the remote relational database 110 and the server RDBMS 108.

Block 320 represents the index advisor 112 performing the Calculate step to provide recommendations concerning the configuration of indexes for the selected target tables 116, 118.

Block 322 represents the index advisor 112 performing the Recommendations step to display the output results from the calculations.

Block 324 represents the index advisor 112 performing the Drop step by displaying the output results from the calculations.

Finally, Block 326 represents the index advisor 112 performing the Summary step by displaying a script that was generated from the previous steps.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. Alternative embodiments may encompass different components, different languages, different steps, or different sequences. In addition, many database management system could benefit from the present invention.

In summary, the present invention discloses a method, apparatus, and article of manufacture for executing an index advisor that specifies an optimal index configuration for use in performing workloads against a database managed by a database management system. If the database and database management system are remotely located from the index advisor, then the index advisor invokes a stored procedure in the database management system in order to obtain information for the optimal index configuration.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented apparatus for accessing a database, comprising:

(a) a computer; and (b) an index advisor, executed by the computer, for specifying an index configuration for use in performing a workload against a remote database managed by a remote database management system, wherein the remote database and remote database management system are executed remotely from the index advisor, and the index advisor invokes a stored procedure in the remote database management system in order obtain information for the index configuration, wherein the workload comprises at last one SOL statement and the stored procedure creates a workload table at the remote database management system and then stores the SQL statements into the workload table.

2. The apparatus of claim 1, wherein the index advisor allows a user to identify target tables in the remote database against which the workload is performed.

3. The apparatus of claim 1, wherein the SQL statements are obtained from a cache maintained by the remote database management system.

4. A computer-implemented apparatus for accessing a database, comprising:

(a) a computer; and (b) an index advisor, executed by the computer, for specifying an index configuration for use in performing a workload against a remote database managed by a remote database management system, wherein the remote database and remote database management system are executed remotely from the index advisor, and the index advisor invokes a stored procedure in the remote database management system in order obtain information for the index configuration, wherein the stored procedure performs one or more functions selected from a group of functions comprising:

(1) a function for creating target tables in a local database managed by a local database management system that are similar to the target tables in the remote database managed by the remote database management system;

(2) a function for examining statistics in the remote database management system and updating the catalog in the local database management system;

(3) a function for copying the workload table from the remote database managed by the remote database management system to the workload table in the local database managed by the local database management system; and (4) a function for modifying one or more operating parameters of the local database management system to match the remote database management system.

5. The apparatus of claim 4, wherein the function for creating (1) comprises a function for copying a structure of the target tables from the remote database to the local database, without copying actual data in the target tables.

6. The apparatus of claim 4, wherein the function for copying (3) comprises a function for copying both a structure of the workload table as well as data stored in the workload table from the remote database to the local database.

7. A computer-implemented method for accessing a database, comprising:

(a) executing an index advisor in a computer, wherein the index advisor specifies an index configuration for use in performing a workload against a remote database managed by a remote database management system, the remote database and remote database management system are executed remotely from the index advisor, and the index advisor invokes a stored procedure in the remote database management system in order to obtain information for the index configuration, wherein the workload comprises at least one SQL statement and the stored procedure creates a workload table at the remote database management system and then stores the SQL statements into the workload table.

8. The method of claim 7, wherein the index advisor allows a user to identify target tables in the remote database against which the workload is performed.

9. The method of claim 7, wherein the SQL statements are obtained from a cache maintained by the remote database management system.

10. A computer-implemented method for accessing a database, comprising:
 (a) executing an index advisor in a computer, wherein the index advisor specifies an index configuration for use in performing a workload against a remote data base managed by a remote database management system, the remote database and remote database management system are executed remotely from the index advisor, and the index advisor invokes a stored procedure in the remote database management system in order to obtain information the index configuration, wherein the stored procedure performs one or more functions selected from a group of functions comprising:
 (1) a function for creating target tables in a local database managed by a local database management system that are similar to the target tables in the remote database managed by the remote database management system;
 (2) a function for examining statistics in the remote database management system and updating the catalog in the local database at system;
 (3) a function for copying the workload table from the remote database managed by the remote database management system to the workload table in the local database managed by the local database management system; and
 (4) a function for one or more operating parameters of the local database management system to match the remote database management system.

11. The method of claim 10, wherein the function for creating (1) comprises a function for copying a structure of the target tables from the remote database to the local database, without copying actual data in the target tables.

12. The method of claim 10, wherein the function for copying (3) comprises a function for copying both a structure of the workload table as well as data stored in the workload table from the remote database to the local database.

13. An article of manufacture embodying logic for performing a method for accessing a database, comprising:
 (a) executing an index advisor in a computer, wherein the index advisor specifies an index configuration for use in performing a workload against a remote database managed by a remote database management system, the remote database and remote database management system are executed remotely from the index advisor, and the index advisor invoke a stored procedure in the database management system in order to obtain information for the index configuration, wherein the workload comprises at least one SQL statement and the stored procedure creates a workload table at the remote database management system and then stores the SQL statements into the workload table.

14. The method of claim 13, wherein the index advisor allows a user to identify target tables in the remote database against which the workload is performed.

15. The method of claim 13, wherein the SQL statements are obtained from a cache maintained by the remote database management system.

16. An article of manufacturing embodying logic for performing a method for accessing a database, comprising:
 (a) executing an index advisor in a computer, wherein the index advisor specifies an index configuration for use in performing a workload against a remote database managed by a remote database management system, the remote database and remote database managed by a remote executed remotely from the index advisor, and the index advisor invokes a stored procedure in the database management system in order to obtain information for the index configuration, wherein the stored procedure performs one or mote functions selected from a group of functions comprising:
 (1) a function for creating target tables in a local database managed by a local database management system that are similar to the target tables in the remote database managed by the remote database management system;
 (2) a function for examining statistics in the remote database management system and updating the catalog in the local database management system;
 (3) a function for copying the workload table from the remote database managed by the remote database management system to the workload table in the local database managed by the local database management system; and
 (4) a function for modifying one or more operating parameters of the local database management system to match the remote database management system.

17. The method of claim 16, wherein the function for creating (1) comprises a function for copying a structure of the target tables from the remote database to the local database, without copying actual data in the target tables.

18. The method of claim 16, wherein the function for copying (3) comprises a function for copying both a structure of the workload table as well as data stored in the workload table from the remote database to the local database.

* * * * *

UNITED STATES PATENT AND TRADEMARK OFFICE
CERTIFICATE OF CORRECTION

PATENT NO. : 6,934,701 B1
DATED : August 23, 2005
INVENTOR(S) : Hall, Jr.

It is certified that error appears in the above-identified patent and that said Letters Patent is hereby corrected as shown below:

Column 8,
Line 11, "last" should read -- least -- and "SOL" should read -- SQL --.

Column 9,
Line 33, "at" should read -- management --.

Column 10,
Line 28, "mote" should read -- more --.

Signed and Sealed this

Twenty-first Day of February, 2006

JON W. DUDAS
*Director of the United States Patent and Trademark Office*